June 27, 1944.  E. B. LEWIS  2,352,441

CLARIFIER FOR OXIDIZING SOLUTIONS

Filed April 2, 1943

Inventor.
Earle B. Lewis
by Harry P. Williams
atty.

Patented June 27, 1944

2,352,441

UNITED STATES PATENT OFFICE 2,352,441

CLARIFIER FOR OXIDIZING SOLUTIONS

Earle B. Lewis, Southington, Conn., assignor to Ethel O. Lewis, Southington, Conn.

Application April 2, 1943, Serial No. 481,558

3 Claims. (Cl. 210—52.5)

A common process for treating steel articles to oxidize their surfaces and give them a rust resisting finish, is to, after cleaning and rinsing the articles, immerse them in a boiling solution of oxidizing salts, and then dip them in an oil or wax bath to increase the rust resistance and improve the finish.

This invention relates to means employed in the oxidizing step of such and similar processes, whereby the oxidizing solution is clarified of impurities and smooth and non-rusting, non-cracking, non-chipping and non-peeling surfaces, are expeditiously and efficiently produced on articles of steel and steel alloys.

Figure 1:
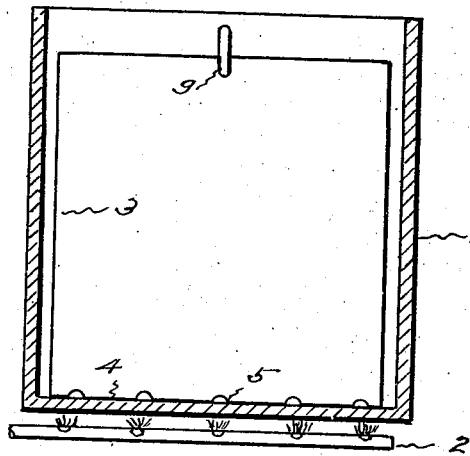
Figure 2:
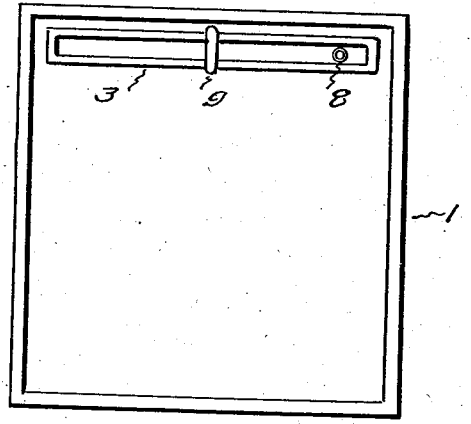
Figure 4:
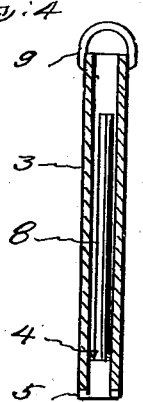
Figure 3:
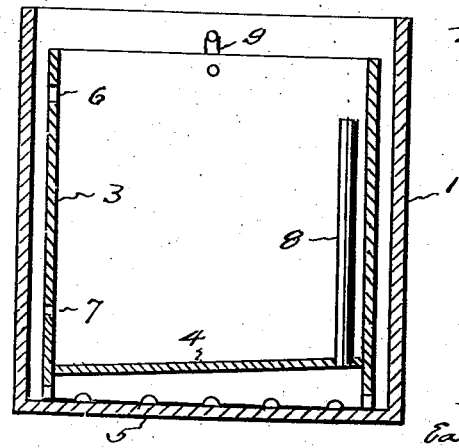

In the accompanying drawing Fig. 1 shows a vertical section of a processing tank and a side elevation of a clarifying chamber therein; Fig. 2 is a top view of the same; Fig. 3 is a vertical section through the tank and the clarifying chamber; Fig. 4 is a vertical section of the chamber taken at right angles to the section of Fig. 2.

The apparatus exemplified has a tank 1, usually constructed of steel, of suitable size and shape for containing the necessary amount of oxidizing solution and the articles to be immersed therein for treatment. Below the tank are means 2 for heating and causing the solution in the tank to boil. The heating means may be steam, electric or gas, a gas burner being indicated.

A clarifying chamber 3 is removably inserted in the tank, preferably near one end. This chamber is made of metal and is of any suitable size and shape. It has a closed bottom 4 which is desirably inclined and is located a short distance above the lower ends of the side walls of the chamber, as illustrated. The bottom edges of the side walls may be notched, as at 5, to allow the free entrance of solution from the tank to the space below the bottom of the chamber. Through the wall of the chamber near the top is an overflow perforation 6 and lower down is a smaller perforation 7. Opening through and extending upward from the bottom to near the top of the chamber is a tube 8. At the top of the chamber is a handle 9 by means of which the chamber may be placed in and removed from the tank.

With a suitable quantity of the appropriate solution in the tank, such solution for instance as would when boiling result in the production of black oxide on the surfaces of steel articles in the tank, and the clarifier in place in the tank, when heat is applied to the bottom of the tank there is created a flow of boiling solution from the bottom of the tank to the under side of the chamber and from there upward through the tube into the upper part of the chamber from which it overflows into the upper part of the tank. As the solution flows from the tube into the upper part of the chamber its flow is retarded by the relative sluggish volume of solution it meets to such an extent that dirt and other impurities that it may carry in a solid state are precipitated and settle to the bottom of the chamber.

As a result of this simple arrangement a constant circulation of solution from the bottom of the tank to the top of the chamber and from there back into the tank is maintained and only solution that is clarified and is most efficient for the required purpose passes from the upper end of the chamber into the tank for acting on the articles to be treated. At intervals the clarifying chamber may be lifted out of the tank and the deposit of undesired material cleaned from its bottom.

The employment of the means illustrated and described results in a more complete and uniform oxidization of the surfaces of the articles, such as gun, tank and airplane parts, as well as machine parts which are exposed to severe service, than is attained by the commonly employed means.

The invention claimed is:

1. Means for use in the process of oxidizing metal articles, which comprises a tank for containing an oxidizing solution, means for heating said tank and causing the solution therein to boil, and a clarifying chamber located in said tank with its side walls resting on the bottom of the tank, said walls having openings through their lower ends for the passage of oxidizing solution from the tank into the chamber, and said chamber having a closed bottom located above said openings through the side walls and a restricted passage opening through said bottom and extending upward therefrom to near the upper end of the chamber, said chamber also having communication at its upper end with the upper end of the tank.

2. Means for use in the process of oxidizing metal articles, which comprises a tank for containing an oxidizing solution, means for heating said tank and causing the solution therein to boil, and a clarifying chamber removably located in said tank with its side walls resting on the bottom of the tank, said walls having openings through their lower ends for the passage of oxidizing solution from the tank into the chamber, and said chamber having a closed bottom located above said openings through the side walls and a restricted passage opening through said bottom and extending upward therefrom to near the upper end of the chamber, said chamber also near its upper end having a port opening to the tank.

3. Means for use in the process of oxidizing metal articles, which comprises a tank for containing an oxidizing solution, means for heating said tank and causing the solution therein to boil, and a clarifying chamber removably located in said tank with its side walls resting on the bottom of the tank, said walls having openings through their lower ends for the passage of oxidizing solution from the tank into the chamber, and said chamber having a closed inclined bottom with a tube opening through said bottom located above said openings through the side walls and extending upward therefrom to near the upper end of said chamber, said chamber also having an opening at its upper end to the upper end of the tank.

EARLE B. LEWIS.